No. 665,818. Patented Jan. 8, 1901.
E. A. WARBURTON & A. A. REDIFER.
LAST BLOCK FASTENER.
(Application filed June 22, 1900.)
(No Model.) 2 Sheets—Sheet 1.
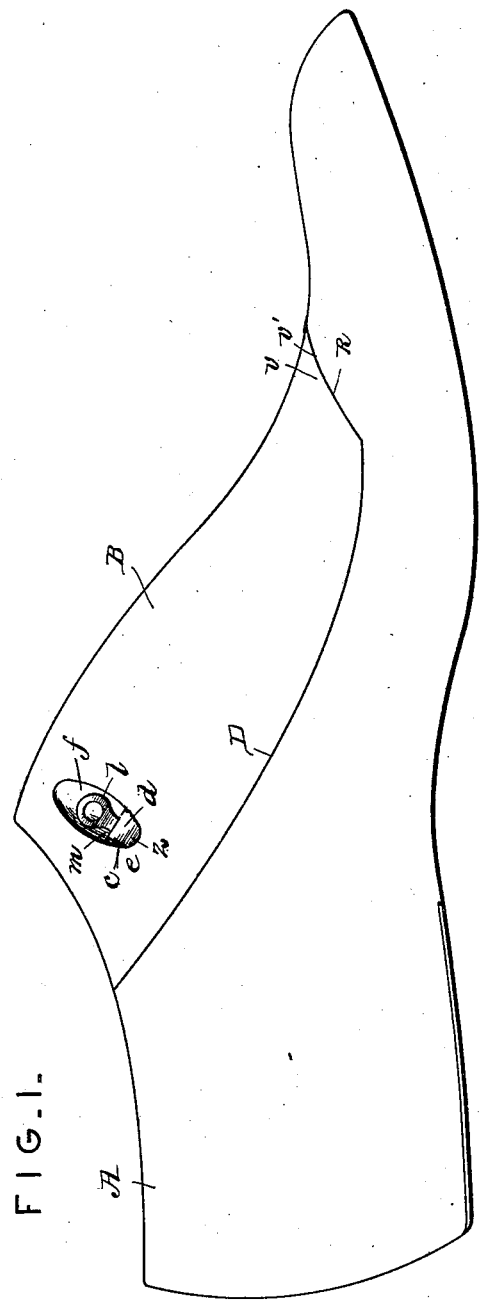
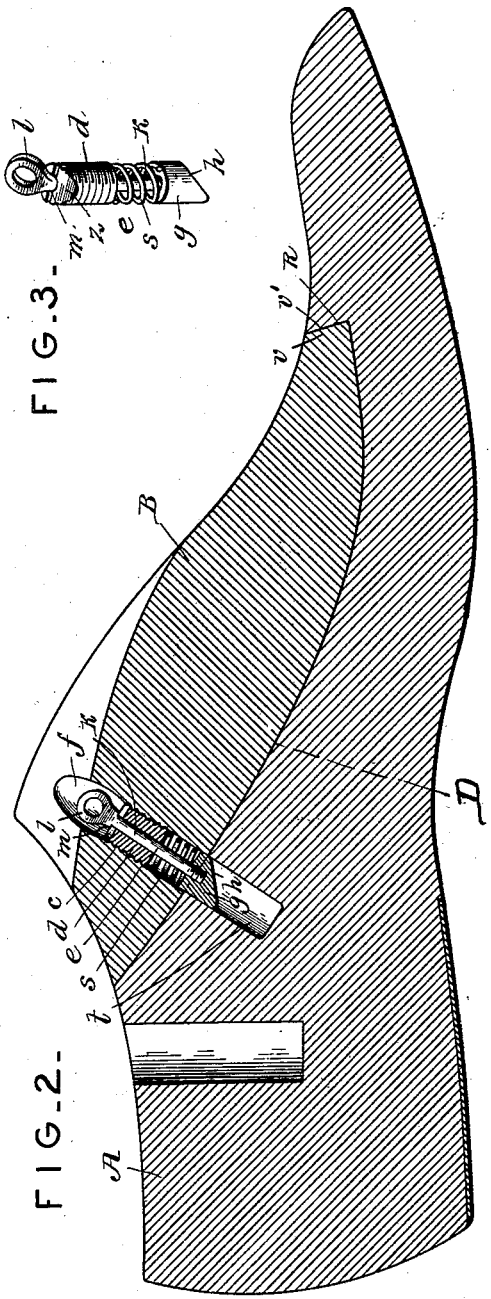
ATTEST-
Harry L. Ames.
George M. Anderson.
INVENTORS-
Edward A. Warburton
Albert A. Redifer.
By E. W. Anderson-
Their Atty.

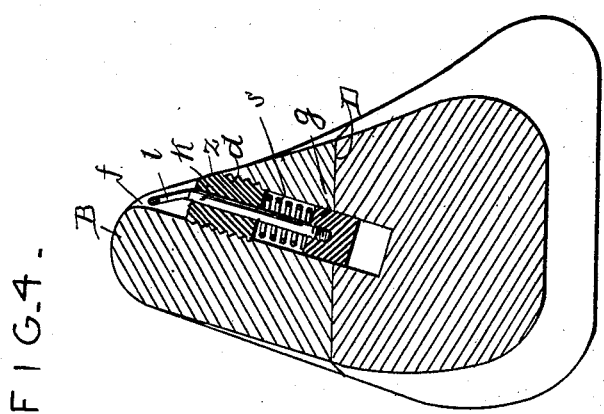

UNITED STATES PATENT OFFICE.

EDWARD A. WARBURTON AND ALBERT A. REDIFER, OF PHILADELPHIA, PENNSYLVANIA.

LAST-BLOCK FASTENER.

SPECIFICATION forming part of Letters Patent No. 665,818, dated January 8, 1901.

Application filed June 22, 1900. Serial No. 21,198. (No model.)

*To all whom it may concern:*

Be it known that we, EDWARD A. WARBURTON and ALBERT A. REDIFER, citizens of the United States, and residents of Philadelphia, in the county of Philadelphia and State of Pennsylvania, have made a certain new and useful Invention in Last-Block Fasteners; and we declare the following to be a full, clear, and exact description of the same, such as will enable others skilled in the art to which it appertains to make and use the invention, reference being had to the accompanying drawings, and to letters of reference marked thereon, which form a part of this specification.

Figure 1 is a side elevation of the invention as applied. Fig. 2 is a central longitudinal section of the same. Fig. 3 is a perspective detail view of the invention. Fig. 4 is a cross-section of our last through the fastening device.

The invention has relation to shoe-lasts; and it consists in the novel construction and combinations of parts constituting a last-block fastening, as hereinafter set forth.

In the annexed drawings the letter A designates the body of the last, and B the instep-block. Through the instep-block is bored a hole $c$, which extends at right angles, or nearly so, to the lower face of the block near its upper portion, and in this hole or aperture $c$ is secured the screw seat or holder $d$ of the latch. The aperture $c$ is laterally arranged so that it is at one side of the median line of the block, and its upper portion therefore forms a concavity or recess $f$ in the side of the block. The latch $e$ has a body portion or head $g$, which is provided with a beveled end $h$. The body portion is provided with a stem or shank $k$, which is usually threaded to engage a threaded aperture in the latch-body in such manner that it is made removable from said body. The upper end of the stem or shank is provided with a head in the form of an eye or catch $l$, which is usually laterally and inwardly inclined with reference to the main portion of the shank in order that when in position the eye or catch will be within the recess or concavity $f$ and protected thereby from casual action. A limiting shoulder or stop $m$ is provided on the stem, the base of the eye or catch usually serving for this purpose. The screw-seat $d$ is formed usually with a bevel $z$ at its upper end on one side, said bevel corresponding with the plane of the side of the instep-block, where the recess $f$ is situated, so that when the screw-seat is in position its bevel-face will be flush with the surface of the block. The stem passes through the screw seat or holder, its latch-body being within the aperture $c$, being held partly projecting therefrom by means of a spring $s$, which is located between said body portion and the seat or holder $d$. The bevel end of the latch is so arranged usually that its toe is in rear, the bevel-face being forward, this position being retained by means of the flattened and inclined construction of the eye or catch, which ascertains the position of the bevel being held flush with the face of the instep-block.

In the last-body is made at the end of the block-seat D an aperture or recess $t$, which is inclined to correspond with the inclination of the aperture in the instep-block. The toe of the instep-block is beveled, as at $v$, or provided with a projection to engage the catch-recess $v'$ at the end of the block-seat R of the last. The bevel construction is preferred, the inclination of bevel being different from that of the aperture $t$ in order that where the latch is engaged with said aperture the toe of the instep-block will be in locking engagement with the catch-recess $v'$.

The fastening is automatic—that is to say, when the instep-block is moved upon its seat D endwise into position the bevel end of the latch will pass readily and without obstruction to position near the mouth of the catch-aperture. In this position a slight pressure of the block downward will cause the toe of the latch to yield until it passes into the mouth of the catch-aperture of the last-body, when the spring will push it downward therein, effecting a secure fastening through the engagement of the latch-body with the inclined wall of the aperture. The parts of the latch being separable the spring can be easily removed when necessary, and the parts can be readily taken out of the instep-block when repairs are required or for service in a new last when the old one is worn out. In the attachment of the parts of the fastening to the instep-block there is no danger of splitting the wood or of otherwise injuring the same.

It will be noted that the aperture through the instep-block is inclined forwardly and laterally of the last, terminating at its upper extremity in one of the lateral faces of the block and at different heights to leave a laterally-accessible protecting recess or concavity and at its lower extremity terminating at about the central portion of the block. The holder seated in said block-aperture terminates short of the upper extremity thereof.

In removing my latch device from its seat in the perforation of the instep-block the latch-head g is first unscrewed from the shank and said head and shank removed with spring s from opposite ends of such perforation, leaving the holder d within the perforation of such block to be subsequently removed therefrom by the application of a screw-driver to its wrench-seat.

Having described this invention, what we claim, and desire to secure by Letters Patent, is—

1. In a last, the combination with an instep-block having an inclined aperture terminating in a beveled entrance at its lateral surface, of a holding-plug seated in said aperture, and forming in connection with said entrance a lateral recess, a latch-bolt engaging said plug and extending through said aperture, having at its upper end a catch-head seated normally entirely within said lateral recess, and at its lower end a latch-head, and a spring between the holding-plug and said latch-head, substantially as specified.

2. In a last, the combination with an instep-block having an inclined aperture terminating in a beveled entrance at its lateral surface, of a screw-threaded, perforated holding-plug, provided with a wrench-seat, seated in said aperture and forming in connection with said entrance a lateral recess, a separable latch-bolt engaging said plug, and extending through said aperture, said bolt having at its upper end a catch-head seated normally entirely within said lateral recess, and having at its lower end a removable latch-head provided with a screw-threaded engagement with said bolt, and a spring between the holding-plug and latch-head, substantially as specified.

In testimony whereof we affix our signatures in presence of two witnesses.

EDWARD A. WARBURTON.
ALBERT A. REDIFER.

Witnesses:
WM. L. FORD,
H. L. AMER.